(12) United States Patent
Nylund

(10) Patent No.: US 8,591,273 B2
(45) Date of Patent: Nov. 26, 2013

(54) LNG FUEL TANK SYSTEM FOR AT LEAST ONE GAS ENGINE USED FOR SHIP PROPULSION

(75) Inventor: Johnny Nylund, S/Etre (NO)

(73) Assignee: Waertsilae Oil & Gas Systems AS, Asker (NO)

( * ) Notice: Subject to any disclaimer, the term of this patent is extended or adjusted under 35 U.S.C. 154(b) by 66 days.

(21) Appl. No.: 13/505,430

(22) PCT Filed: Nov. 2, 2010

(86) PCT No.: PCT/NO2010/000399
§ 371 (c)(1),
(2), (4) Date: May 1, 2012

(87) PCT Pub. No.: WO2011/053164
PCT Pub. Date: May 5, 2011

(65) Prior Publication Data
US 2012/0216919 A1    Aug. 30, 2012

(30) Foreign Application Priority Data
Nov. 2, 2009    (NO) .................................. 20093272

(51) Int. Cl.
*F02B 61/04*    (2006.01)
(52) U.S. Cl.
USPC ............ 440/88 F; 62/51.2; 62/613; 114/74 A
(58) Field of Classification Search
USPC ........ 114/74 A; 440/88 F; 62/50.2, 51.2, 611, 62/613, 619
See application file for complete search history.

(56) References Cited

U.S. PATENT DOCUMENTS

| | | | |
|---|---|---|---|
| 4,924,822 A | 5/1990 | Asai et al. | |
| 6,220,052 B1 * | 4/2001 | Tate et al. | ........................ 62/613 |
| 7,438,012 B2 * | 10/2008 | Kackur | ........................ 114/74 A |
| 7,955,149 B2 * | 6/2011 | Levander et al. | ............. 440/88 F |
| 8,499,569 B2 * | 8/2013 | Van Tassel | ........................ 62/611 |
| 2006/0053806 A1 | 3/2006 | Tassel | |

(Continued)

FOREIGN PATENT DOCUMENTS

| | | |
|---|---|---|
| WO | 2008/000898 A1 | 1/2008 |
| WO | 2009/081278 A1 | 7/2009 |

OTHER PUBLICATIONS

"International Code for the Construction and Equipment of Ships Carrying Liquefied Gases in Bulk (IGC Code)", ISBN: 978-92-801-1277-1, 1993 Edition, 1993, pp. 1-27.

(Continued)

*Primary Examiner* — Lars A Olson
(74) *Attorney, Agent, or Firm* — Morrison & Foerster LLP

(57) ABSTRACT

An LNG fuel tank system for at least one gas engine used for ship propulsion is comprising at least one LNG fuel tank (4) and a gas vessel (8), the LNG fuel tank to be-bunkered from an onshore LNG pressure tank filling facility by means of an LNG filling line (1). According to the present invention the LNG fuel tank (4) is a ship low pressure controlled atmospheric pressure LNG tank, and the gas vessel (8) is a single shell non-insulated pressure vessel arranged to accumulate flashed and boil-off gas during LNG bunkering and pressure relieving the LNG fuel tank, respectively, and the gas engines are fuelled from either the gas vessel (8) or the LNG fuel tank (4), dependent on a predefined gas vessel pressure.

12 Claims, 1 Drawing Sheet

(56) References Cited

U.S. PATENT DOCUMENTS

2006/0086412 A1 4/2006 Spittael et al.
2007/0175226 A1 8/2007 Karlsson et al.
2009/0239426 A1 9/2009 Levander et al.

OTHER PUBLICATIONS

International Search Report and Written Opinion received for PCT Patent Application No. PCT/NO2010/000399, mailed on Feb. 3, 2011, 10 pages.

* cited by examiner

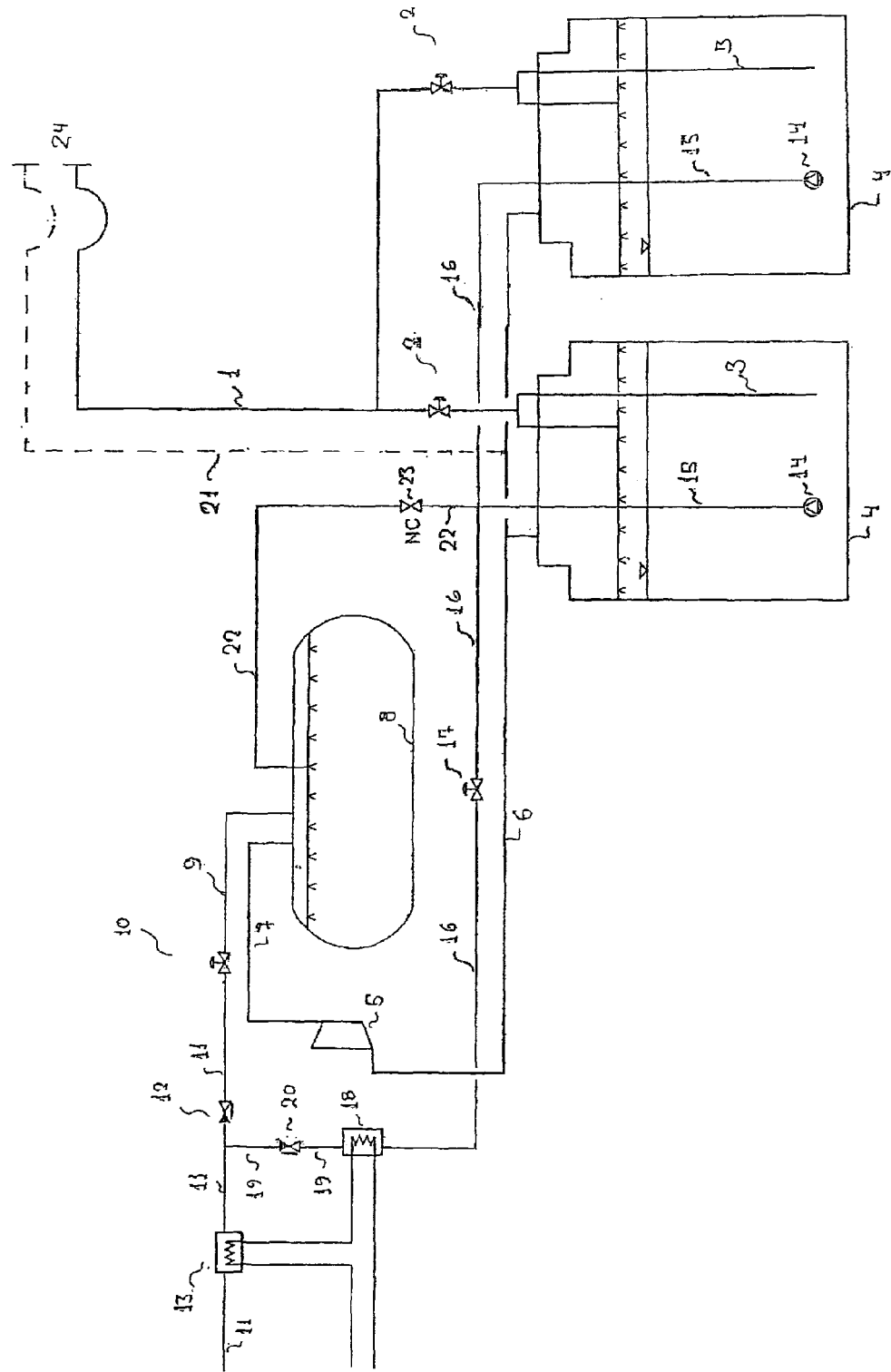

LNG FUEL TANK SYSTEM FOR AT LEAST ONE GAS ENGINE USED FOR SHIP PROPULSION

The present invention relates to an LNG fuel tank system for at least one gas engine used for ship propulsion. More specifically, the LNG fuel tank system comprises at least one LNG fuel tank and a gas vessel, the LNG fuel tank to be bunkered from an onshore LNG pressure tank filling facility by means of an LNG filling line, as defined in the preamble of attached claim 1.

Heavy fuel oil (HFO) is nowadays the most common fuel for ship propulsion. To limit pollution, international regulations set limits for the sulphur content in the HFO, and the emission of nitrogen oxides and carbon dioxide to the atmosphere. While sulphur and nitrogen is mainly hurting the local environment, the emission of carbon dioxide is a global problem.

A major step forward in terms of environmental protection is to utilize methane as fuel for ship propulsion, whereby the emission of both sulphur, nitrogen oxides and carbon dioxide is reduced. The price of LNG has also been lower than HFO and diesel oil, so there is both an environmental and economic benefit of using fuel of methane. The principle used up to now is to fill commercial liquefied methane+ (LNG) in pressure vessel tanks onboard the ship and maintained the pressure at typical 5-7 bar gauge. The LNG is then vaporized and heated to the condition required by the propulsion gas engine.

About a dozen ships with LNG Fuel Systems have been built in Norway, and onshore LNG filling stations have been established to supply these ships. Both the onshore LNG tanks and the ship LNG tanks are double shell vacuum insulated pressure vessels. To obtain longer sailing distances between each filling of LNG, there is an interest among ship owners to use prismatic LNG tanks which utilize the hull shape better than pressure vessels. Prismatic tanks carry LNG at atmospheric pressure.

The challenge is how to load LNG from a pressurized onshore LNG tank and into a ship tank which can sustain atmospheric pressure only, without emitting methane gas to the atmosphere. Further to this, the heat ingress to an atmospheric tank is much higher than to a vacuum insulated pressure vessel tank, and particular remedies is to be used to handle the increased boil-off.

Ship borne tanks for carrying liquefied gases in bulk are classified in The United Nations Regulation, IMO Publication: "International Code for the Construction and Equipment of Ships Carrying Liquefied Gases in Bulk—IGC Code:" (ISBN 978-92-801-1277-1, 1993 edition).

Atmospheric pressure LNG tanks are classified as "Independent Tanks Type A", and are operated at atmospheric pressure and with 0.7 bar gauge as Maximum Allowable Relief Valve Setting (MARVS).

Due to the risk of leakage from a prismatic tank (dominating bending stresses), an Independent Tank Type A (Type A tank for short) is required to have a complete "secondary barrier" to contain LNG in case of leakages.

Pressure vessel LNG tanks without any penetration below liquid level are classified as "Independent Tank Type C", provided the design pressure is above a certain limit given by the tank dimensions.

An Independent Tank Type C is not required to have any "secondary barrier" (dominating membrane stresses).

If the LNG pressure vessel tank has penetration below liquid level, full "secondary barrier" is required; cf. IMO Maritime Safety Committee MSC.285 (86): "Interim Guidelines on Safety for Natural Gas-Fuelled Engine Installations in Ships".

In the present disclosure, the term "Type A tank" has for convenience of the reader been replaced by the term "atmospheric pressure LNG tank".

The challenge to handle the flashed gas during filling of LNG into atmospheric pressure LNG tanks has according to one option been met by a Wartsila Patent i.e. WO 2008/000898 A1 "Fuel Systems for Gas Driven Vessel".

Wartsila's solution is quite similar to the system used on all existing LNG fuelled ships, as already outlined above, but the LNG is pumped into the ship borne pressure vessel LNG tank from the atmospheric pressure LNG tank. To control the pressure of the atmospheric pressure LNG tank, the vapor is pumped into the pressure vessel LNG tank by means of compressors. The pressure vessel tank supplying fuel to the gas engine on the ship is thus LNG filled and insulated.

The problem to be solved by the present invention is mainly due to three circumstances i.e. onshore LNG pressure tanks, LNG bunkering and holding time.

Onshore storage tanks for LNG fuelling of ships are as per today all of vacuum insulated pressure vessel type. Typical design pressure is about 10 bar gauge. These onshore LNG tanks are normally filled from LNG trucks, which also are equipped with pressure vessel LNG tanks. The onshore LNG storage tanks can also be filled by means of small LNG Carriers, all equipped with pressure vessel tanks classified as "Independent Tanks Type C". Heat is leaking into the LNG both during filling into truck/LNG carrier, transport, during filling into storage tank, and during storage in the onshore LNG tank. The LNG in the onshore LNG storage tank is therefore at temperature higher than $-163°$ C., and consequently the saturation pressure is higher than atmospheric pressure.

During filling from an onshore LNG tank at elevated pressure into a ship atmospheric pressure LNG tank, LNG evaporates and the pressure of the atmospheric pressure LNG tank increases. If the onshore LNG tank saturation pressure is well below 0.7 bar gauge, the ship atmospheric pressure LNG tank can be filled without relieving methane gas to the atmosphere. If the onshore LNG tank saturation pressure is close to 0.7 bar gauge, the LNG is picking up some heat from the pump, piping and tank, which might cause the pressure relief valve to open and release methane to the atmosphere during LNG filling. If the onshore LNG tank saturation pressure is above 0.7 bar gauge, the pressure relief valve of the atmospheric pressure LNG tank is opened, and methane gas is released to the atmosphere. At say 1.5 bar gauge pressure in the onshore LNG tank, a substantial amount of methane gas is released to the atmosphere. Therefore, a system for handling the flashed gas has be arranged, and which is the subject for the present invention.

An LNG tank is subject to heat ingress from the surroundings, which in turn causes LNG to evaporate, and the tank pressure to increase until the pressure relief valve opens. The holding time is the elapsed time until the pressure relief valve opens. While a double shell vacuum insulated pressure vessel tank has a holding time of "months", an atmospheric pressure LNG tank has a holding time of "days". If the initial vapour pressure of an atmospheric pressure LNG tank is about atmospheric pressure, the holding time is typically slightly more than a week. If the initial vapour pressure of an atmospheric pressure LNG tank is about 0.5 bar gauge, the holding time is typically a couple of days. In case of off-hire exceeding the durations above, a system for handling of the evaporated gas has therefore to be arranged, which also is the subject for the present invention.

To meet the challenges specified above, the present inventing proposes an LNG fuel tank system for at least one gas engine used for ship propulsion, comprising at least one LNG fuel tank and a gas vessel, the LNG fuel tank to be bunkered from an onshore LNG pressure tank filling facility by means of a LNG filling line, wherein the LNG fuel tank is a ship low pressure controlled atmospheric pressure LNG tank, and the gas vessel is a single shell non-insulated pressure vessel arranged to accumulate flashed and boil-off gas during LNG bunkering and pressure relieving the LNG fuel tank, respectively, and the gas engines are fuelled from either the gas vessel or the LNG fuel tank, dependent on a predefined gas vessel pressure.

The vapour pressure within the LNG fuel tank can be controlled to be below about 0.7 bar gauge. A compressor situated in a suction and compression line extending between the LNG fuel tank and gas vessel can be used so as to limit the LNG fuel tank pressure during bunkering and pressure relieving the LNG fuel tank.

The gas engine can be fuelled from the gas vessel until the pressure approaches about 5-6 bar gauge, whereafter the fuelling is effected from the LNG fuel tank. Propulsion gas from the gas vessel can be supplied via a gas line passing a heater.

Propulsion gas from the LNG fuel tank can be supplied via a liquid and vapour line having a mainly vertical vertical riser equipped with a centrifugal pump situated near a lower portion of the LNG fuel tank, the LNG being evaporated in a vaporizer. Vapour from the vaporizer can be flowed through the vapour line via a check valve into the gas line upstream the heater.

When extra fuel is needed for ship propulsion, gas can be supplied from both the gas vessel and vaporizer.

To reduce the gas temperature when needed, the riser can be provided with a spray line extending into the gas vessel, the spray line including a normally closed valve.

Other favourable features of the present invention is to be understood by the dependent patent claims and detailed discussion below.

Now, the present invention is to be discussed in more detail with reference to FIG. 1 showing a process scheme.

To avoid release to the atmosphere of methane during LNG bunkering and when at sea, the present invention is relating to a LNG fuel tank system for handling flashed and boil-off gas. In this case a compressor makes sure that the pressure in the atmospheric pressure LNG tank never exceeds 0.7 bar gauge, but deliver the flashed/evaporated gas to a pressure vessel tank containing gas only.

FIG. 1 shows a simplified process scheme for a ship with two atmospheric pressure LNG tanks, for instance, which by means of pumps, vaporizer, heater, compressor and gas vessel, for instance, supplies fuel gas to one or several gas engines. The gas engine can be fuelled from the gas vessel or either of the atmospheric pressure LNG tanks.

LNG Bunkering
LNG Filling

The LNG bunkering takes place from an onshore LNG filling station pressure vessel, not illustrated, which according to LNG suppliers experience may have a saturation pressure as high as 2 bar gauge.

The LNG is pumped from the onshore LNG filling station through a LNG filling line 1. At the inlet of the atmospheric pressure LNG tank 4 the LNG is passed through a Joule-Thompson valve 2. The J-T valve flow is controlled by the vapour pressure of the atmospheric pressure LNG tank. The vapour pressure is always to be below 0.7 bar gauge. From the J-T valve the LNG flow down a bottom fill line 3 extending into the atmospheric pressure LNG tank 4.

Atmospheric Pressure LNG Tank Excessive Pressure Control

When the LNG flows through the J-T valve 2, a certain amount of flash gas is formed. The higher saturation pressure in the onshore LNG pressure vessel, the more flash gas is formed, and the pressure of the atmospheric pressure LNG tank is tending to increase. The J-T valve control outlined above is not be able to limit the pressure of the atmospheric pressure LNG tank, but is closed completely and thereby stopping the LNG filling.

The compressor 5 removes the flash gas from the atmospheric pressure LNG tank via a suction line 6 and a compression line 7 into a single shell gas vessel 8, and thereby the pressure of the atmospheric pressure LNG tank is limited. The gas flow through the compressor 5 is controlled by the vapour pressure of the atmospheric pressure LNG tank. As already mentioned, the vapour pressure within the atmospheric pressure LNG tank is always to be below 0.7 bar gauge.

Gas Vessel

The main purpose of the gas vessel 8 is to serve as a gas buffer during LNG filling. The higher saturation pressure in the onshore LNG pressure vessel, the more need for the gas vessel. To ascertain sufficient buffer capacity while saving space, the design pressure for the gas vessel can be made higher than 10 bar gauge (previous requirement limit for Compressed Natural Gas (CNG) tanks below deck. Specified by IMO Maritime Safety Committee MSC.285 (86): "Interim Guidelines on Safety for Natural Gas-Fuelled Engine Installations in Ships"). Compressing the flash gas to above say 20-25 bar gauge increases the gas temperature, so that normal carbon-manganese steels can be used for the gas vessel 8.

The gas vessel shall be a standard single shell pressure vessel without any thermal insulation. The selection of operating pressure is based upon flash gas amount, needed space and compressor cost.

Normal Operation
Fuel from the Gas Vessel

At completion of the LNG bunkering, the pressure of each atmospheric pressure LNG tank is near atmospheric (0-0.5 bar gauge) and thus below MARVS, while the gas vessel is near its design pressure. At this time, the actual gas engine is fuelled directly from the gas vessel. Fuel gas at say 25 bar gauge (example only) flows from the gas vessel 8 via a gas line 9 to a gas line J-T valve 10 where the pressure is reduced to about 5-7 bar gauge. The fuel gas flows further through a gas line 11 via a check valve 12, through a heater 13 and thereafter to the regulating unit for the gas engine(s). The flow through J-T valve 10 is controlled by the pressure in the gas line 11 downstream the valve.

The gas engine is fuelled from the gas vessel 8 until the pressure approaches say 5-7 bar gauge. Fuel gas supply from the gas vessel has priority over the fuel gas supply from the atmospheric pressure LNG tank. In this way the gas vessel is available to receive gas at any situation where the pressure in the atmospheric pressure LNG tank approaches MARVS.

Fuel From the Atmospheric Pressure LNG Tank

When the gas vessel pressure approaches say 5-7 bar gauge, the fuel gas is switched to be supplied from the atmospheric pressure LNG tank 4.

LNG is pumped by means of a centrifugal pump 14 at the bottom of the atmospheric pressure LNG tank 4, up through the vertical pump riser 15 and through the liquid line 16 to the control valve 17. The flow through control valve 17 is controlled by the pressure in liquid line 16 downstream the valve, which is kept at about 5-7 bar gauge. The LNG is further evaporated in the vaporizer 18, and the vapour flows through vapour line 19 via check valve 20 and into the gas line 11. The vapour flows through the heater 13 and thereafter to the regulating unit for gas engine(s). The vaporizer 18 and the heater 13 are heated by means of the gas engine's cooling system or other available heating system onboard the ship.

Atmospheric Pressure LNG Tank Pressure Vacuum Control

When the gas engine consumes fuel, the LNG level of the atmospheric pressure LNG tank 4 decreases, tending to reduce the pressure of the tank void. However, for an atmospheric pressure LNG tank 4 the pressure increase due to heat ingress is substantial higher than the pressure reduction due to LNG consumption. There is thus no danger that the void pressure is dropping below atmospheric pressure during normal operation.

Atmospheric Pressure LNG Tank Excessive Pressure Control

The heat ingress is making void pressure of the atmospheric pressure LNG tank to increase unless the boil-off volume is removed by the compressor 5 and accumulated in the gas vessel 8. However, the "LNG heat ingress case" is a much less stringent requirement to the gas handling system than the "LNG filling case"

The suggested gas handling tank system do therefore allow for an atmospheric pressure LNG tank with less insulation than the "standard" 30 centimeter.

Boost Operation

In certain cases the gas engine needs extra fuel supply for a shorter or longer period. While the vaporizer may not be able to provide such an excess amount of fuel gas, the gas vessel in such cases provides the needed fuel gas amount.

Options from Atmospheric LNG Tanks

The process solution which is subject to the present invention is mainly intended to solve problems incurring in connection with loading LNG from an onshore pressurized tank and into a ship atmospheric pressure LNG tank.

The process solution can easily be adapted to LNG filling from onshore atmospheric pressure LNG tank as well. A vapour return line 21 is then simply added between the atmospheric pressure LNG tank top and the LNG bunkering station 24. This vapour return line shall during filling be connected to the onshore atmospheric pressure LNG tank vapour phase.

In this case the requirement to gas handling during LNG filling is to be somewhat relaxed (depending on pressure drop in vapour return line).

Spray Line

A spray line 22 is branched off from the liquid line 17 and connected to the gas vessel 8 via a normally closed valve 23. This spray line is to be used in cases where the gas temperature in the gas vessel needs to be reduced.

It is understood that most components other than the the atmospheric pressure LNG tank and gas vessel such as the J-T valves, for instance, could be replaced by any other suitable means proving for the same or equivalent function.

The invention claimed is:

1. A liquefied natural gas (LNG) fuel tank system for at least one gas engine used for ship propulsion, comprising at least one LNG fuel tank and a gas vessel, the LNG fuel tank configured to be bunkered from an onshore LNG pressure tank filling facility utilizing an LNG filling line, wherein the LNG fuel tank is a ship low pressure controlled atmospheric pressure LNG tank, and the gas vessel is a single shell non-insulated pressure vessel arranged to accumulate flashed and boil-off gas during LNG bunkering and pressure relieving the LNG fuel tank, respectively, and that the gas engines are fuelled from either the gas vessel or the LNG fuel tank, dependent on a predefined gas vessel pressure.

2. The LNG fuel tank system according to claim 1, wherein the LNG fuel tank is pressure controlled using a Joule-Thompson valve arranged in the LNG filling line.

3. The LNG fuel tank system according to claim 1, wherein the vapor pressure within the LNG fuel tank is controlled to be below about 0.7 bar gauge.

4. The LNG fuel tank system according to claim 1, wherein a compressor which is situated in a suction and compression line extending between the LNG fuel tank and gas vessel is used as to limit the LNG fuel tank pressure during bunkering and pressure relieving the LNG fuel tank.

5. The LNG fuel tank system according to claim 1, wherein the gas engine is configured to be fuelled from the gas vessel until the pressure approaches about 5-7 bar gauge, whereafter the fuelling is effected from the LNG fuel tank.

6. The LNG fuel tank system according to claim 5, wherein propulsion gas from the gas vessel is supplied via a gas line passing a heater.

7. The LNG fuel tank system according to claim 6, wherein the gas flow pressure is reduced using a Joule-Thompson valve arranged upstream the heater.

8. The LNG fuel tank system according to claim 5, wherein propulsion gas from the LNG fuel tank is supplied via a liquid and vapor line having a mainly vertical riser equipped with a centrifugal pump situated near a lower portion of the LNG fuel tank, the LNG being evaporized in a vaporizer.

9. The LNG fuel tank system according to claim 8, wherein vapor from the vaporizer is flowed through the vapor line via a check valve into the gas line upstream of the heater.

10. The LNG fuel tank system according to claim 8, wherein propulsion gas is supplied from both the gas vessel and vaporizer when extra fuel is needed for propulsion of the ship.

11. The LNG fuel tank system according to claim 8, wherein the riser is provided with a spray line extending into the gas vessel as to reduce the gas temperature when needed, the spray line including a normally closed valve.

12. The LNG fuel tank system according to claim 1, wherein the LNG fuel tank system is configured to allow for filling from atmospheric pressure LNG tanks as well, a vapor return line is added between the top of the LNG fuel tanks and LNG onshore filling facility.

* * * * *